Figure 4:
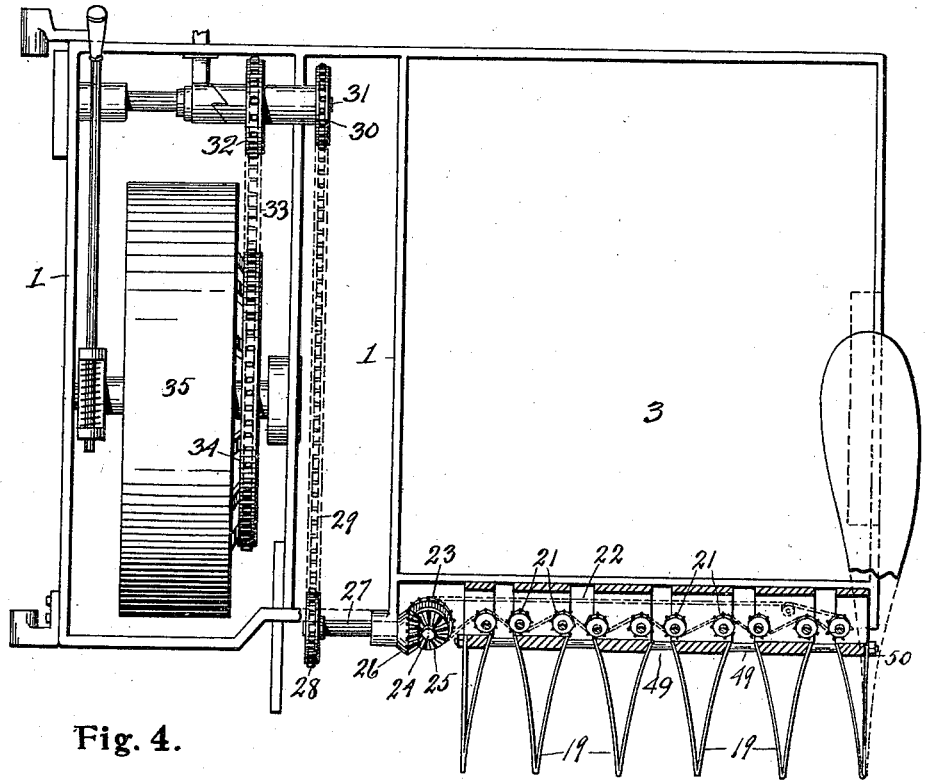

J. H. PHILIPP & C. F. GARAGHTY.
FLAX HARVESTING MACHINE.
APPLICATION FILED DEC. 11, 1908.
966,470.
Patented Aug. 9, 1910.
3 SHEETS—SHEET 1.
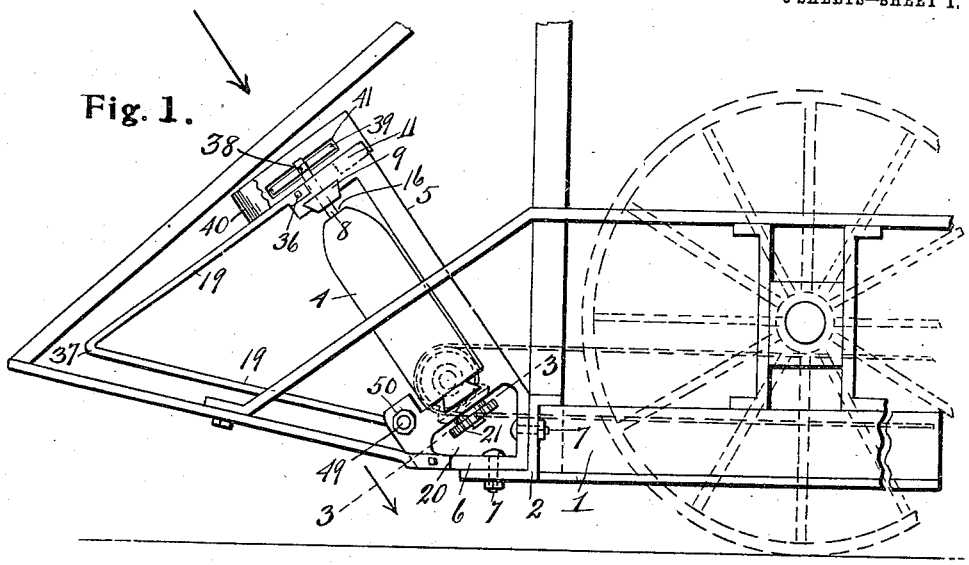
Fig. 1.
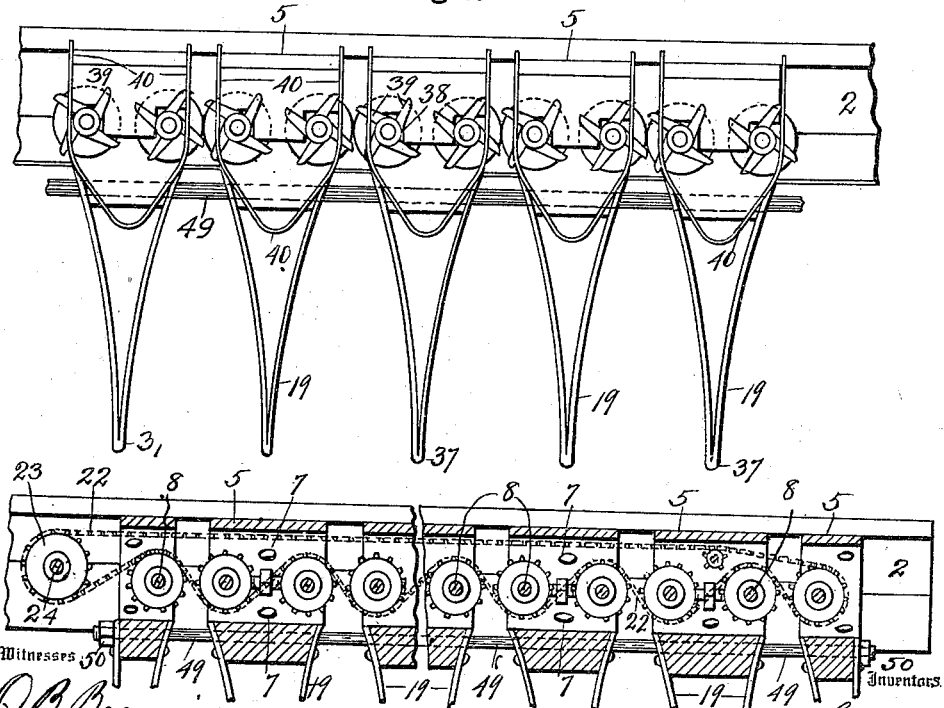
Fig. 2.
Fig. 3.

J. H. PHILIPP & C. F. GARAGHTY.
FLAX HARVESTING MACHINE.
APPLICATION FILED DEC. 11, 1908.
966,470.
Patented Aug. 9, 1910.
3 SHEETS—SHEET 3.
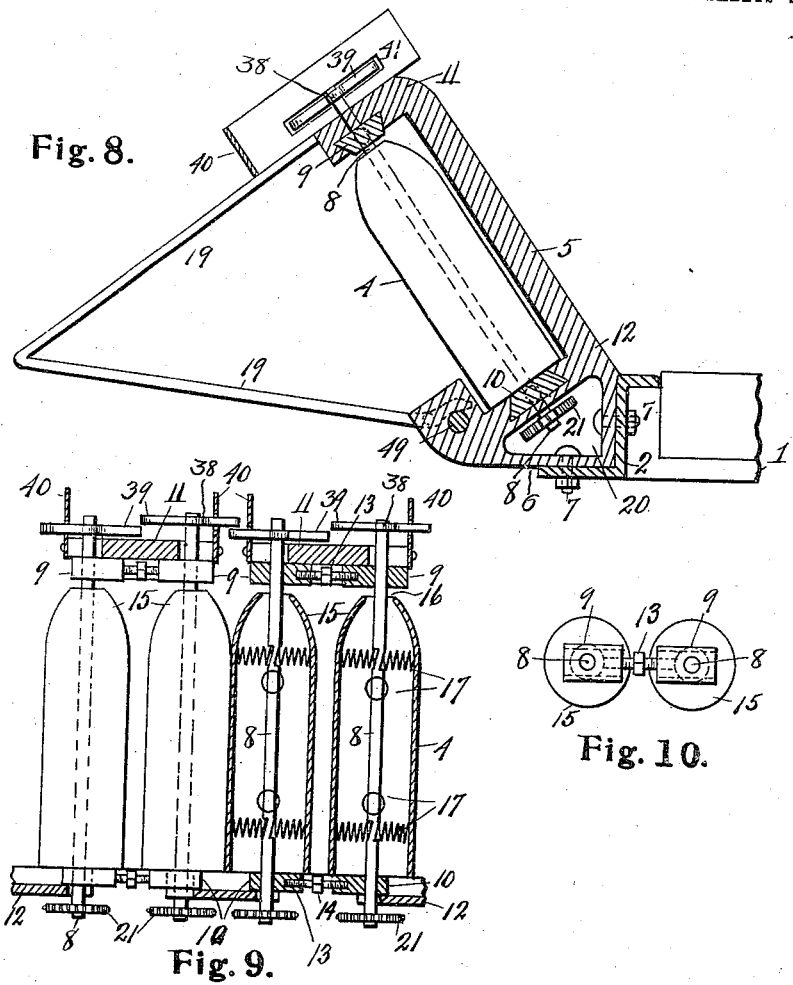
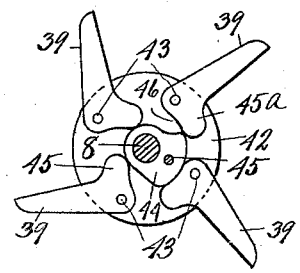
Witnesses
O. B. Baenziger.
J. G. Howlett.
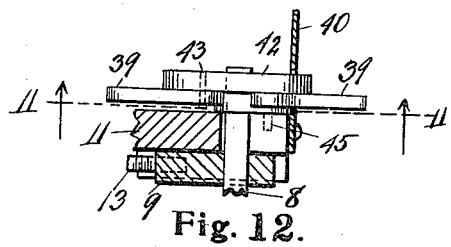
Inventors.
Julius H. Philipp.
Charles F. Garaghty.
by T. S. Wheeler & Co.
Attorneys

UNITED STATES PATENT OFFICE.

JULIUS H. PHILIPP, OF PORT HURON, AND CHARLES F. GARAGHTY, OF DETROIT, MICHIGAN.

FLAX-HARVESTING MACHINE.

966,470.  Specification of Letters Patent.  Patented Aug. 9, 1910.

Application filed December 11, 1908. Serial No. 466,934.

*To all whom it may concern:*

Be it known that we, JULIUS H. PHILIPP, a citizen of the United States, residing at Port Huron, St. Clair county, Michigan, and CHARLES F. GARAGHTY, also a citizen of the United States, residing at Detroit, in the county of Wayne, State of Michigan, have invented certain new and useful Improvements in Flax-Harvesting Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a flax harvesting machine, and consists in the construction and arrangement of parts hereinafter more fully set forth and pointed out particularly in the claims.

The primary object of the invention is to provide comparatively simple and effective means for harvesting standing flax by pulling it from the ground and delivering the stalks onto a table or platform from whence they may be conveyed and disposed of in any desired manner.

A further object is to provide means for pulling the flax wherein the arrangement is such that undue crushing and abrasion of the stalks is obviated, and at the same time provision is made for maintaining the requisite pressure upon the pulling rollers which engage the stalks notwithstanding any variation in the size of the stalks or in the quantity which may from time to time be present between the pulling rollers.

A further object of the invention is to provide means for driving the rollers in pairs so as to permit of a lateral movement of said rollers without interfering with the driving thereof.

A further object is to provide for gathering the flax in advance of the pulling rollers and directing the gathered stalks therebetween in a manner to insure a correct operation of the rollers upon the stalks of flax in the operation of pulling said stalks.

A further object is to provide for so mounting and actuating the pulling rollers as to render them effective in the operation of pulling the stalks from the ground and depositing them upon the platform of the machine.

The above objects are attained by the mechanism illustrated in the accompanying drawings, in which:—

Figures 5, 6, 7:
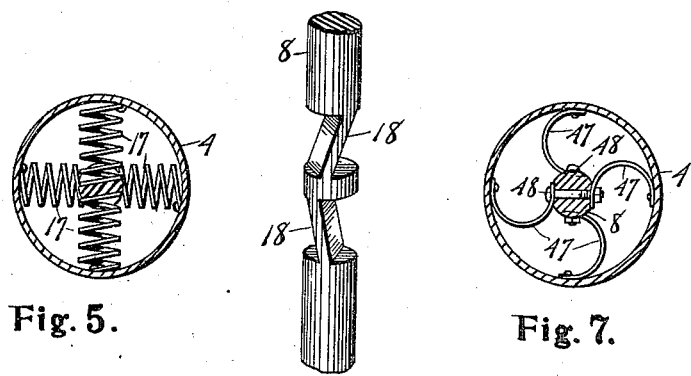

Figure 1 is a fragmentary view in side elevation, showing one embodiment of our invention in a machine of the character described. Fig. 2 is a fragmentary view in plan of the guards and the front portion of the machine in which the pulling rollers are mounted, said view being in the direction of the large arrow in Fig. 1. Fig. 3 is a horizontal section as on line 3—3 of Fig. 1. Fig. 4 is a plan view of the machine. Fig. 5 is an enlarged transverse section through one of the pulling rollers. Fig. 6 is a perspective view of a portion of one of the shafts or spindles upon which said rollers are mounted, showing the flat angular portions thereof which are embraced by the coiled springs to flexibly mount or suspend the rollers upon said shafts or spindles. Fig. 7 is a transverse section through one of the rollers, showing a modified construction for flexibly mounting the roller upon its supporting shaft or spindle. Fig. 8 is a fragmentary view in section through one of the supporting castings in which the rollers are mounted, the roller shown appearing in elevation. Fig. 9 is a fragmentary view partly in section, showing the manner of mounting the rollers on their shafts and supporting said shafts in adjustable boxes in the castings forming a part of the frame. Fig. 10 is an elevation of two of the adjustable boxes in which the ends of the roller shafts are journaled. Fig. 11 is a sectional view on line 11—11 of Fig. 12, showing an arrangement for pivotally mounting the gathering arms and actuating them by a fixed cam to retract them from the stalks of flax and prevent carrying said stalks into the housing through an opening in which said arms project. Fig. 12 is an elevation of the parts shown in Fig. 11, with some of the associated parts appearing in section.

Referring to the characters of reference, 1 designates the frame of the machine which may be of any suitable construction, but which is preferably of the character of harvesting machines in common use. Crossing the front of the machine and secured to the frame thereof is an angle bar 2 which may be termed the front beam or sill of the frame.

The active elements comprised in the flax pulling mechanism which operate upon the stalks of flax to pull them from the ground and deposit them upon the platform 3 of the machine, consist of a series of rollers set at a suitable incline and rotatable in pairs in opposite directions between which the stalks of flax are directed by the projecting guards and by the gathering arms, which latter rotate in conjunction with said rollers.

The pulling rollers 4 are projected in advance of the angle iron sill 2 of the frame of the machine and are held at an angle of approximately 55° to a perpendicular by means of a suitable supporting frame comprising a plurality of cast sections or brackets 5 arranged in parallelism, and each of which is provided with a rectangular base portion 6 adapted to fit into the angle of the sill or cross beam 2 to which it is secured by the transverse bolts 7.

Each of the brackets 5, excepting those at the opposite ends of the frame, are adapted to carry two of the rollers 4 which are mounted upon spindles or shafts 8 that are in turn journaled at their opposite ends in slidable boxes 9 and 10 respectively. The boxes 9 are mounted in a dovetailed way in the head portion 11 of the bracket 5, and the boxes 10 are mounted in a dovetailed way in the foot portion 12 of said bracket. A screw 13 having a right and left thread at its opposite ends connects the boxes 9 for the purpose of moving said boxes laterally to adjust the rollers upon the shafts 8. A similar screw 14 connects the boxes 10 at the opposite ends of the shaft 8 for a similar purpose.

The rollers, as will be seen, are hollow and each is provided with a conical forward end 15 for the purpose of more readily directing the stalks of flax between them. The opening 16 in the conical end of each of the rollers is of such diameter as to avoid contact with the shaft 8, which passes therethrough, even when said roller is moved laterally with respect to said shaft.

To mount the rollers upon the shafts 8 so as to render them laterally movable, and at the same time cause them to rotate with said shafts, each of said rollers is provided with a plurality of coiled springs 17 which cross the interior diametrically and whose ends are secured to the inner wall of the roller. These springs are located at the opposite ends of the rollers and are preferably employed in pairs so positioned as to cross the interior of the roller at right angles. In order to suspend the roller from the shaft by means of said springs, said shaft is provided with a flat portion 18 at the point where the spring crosses the same which stands at such an angle as to enter between the coils of the spring, as clearly shown in Figs. 5 and 6, whereby each of the springs 17 becomes attached at its longitudinal center to the shaft and the roller becomes suspended or yieldingly supported upon the shaft through the medium of said springs, which while causing the roller to rotate with the shaft, permit said roller to have a lateral movement thereon in all directions. As before stated, each of the brackets or cast sections 5 contain two of the rollers 4, and said brackets are so mounted upon the sill or angle beams 2 as to afford a space between them. The rollers are so disposed in said brackets as to cause a portion of their peripheries to project beyond the plane thereof so that when the brackets are properly positioned, the peripheries of the opposed rollers in the adjacent brackets will engage each other throughout the length of the parallel faces thereof. As the machine advances, the stalks of flax are directed by the forwardly projecting guards 19 between the pairs of rollers, which turn in contiguity, whereby said rollers are caused to act upon said stalks to pull them from the ground and discharge them rearwardly onto the platform of the machine.

To provide for driving the rollers so that the rollers of each pair whose faces are contiguous, shall revolve in opposite directions to carry the stalks upwardly between them, the shaft of each roller which at its lower end extends into the opening 20 at the base of the bracket 5, has mounted thereon a suitable sprocket wheel 21. These sprocket wheels are in horizontal alinement and are driven by a chain 22 which passes alternately over and under the successive sprocket wheels on the shafts of the rollers, as clearly shown in Fig. 3, and over a driving sprocket wheel 23 mounted on a stub shaft 24 which is supported in the frame and which also carries a beveled gear wheel 25, as shown in Fig. 4. The beveled gear 25 meshes with a like gear 26 on one end of shaft 27. The opposite end of shaft 27 carries a sprocket wheel 28 over which passes a sprocket chain 29 leading from a sprocket wheel 30 on shaft 31. Said last mentioned shaft is driven through the medium of a sprocket wheel 32 thereon over which passes a chain 33 from the large sprocket wheel 34 on the traction wheel 35. Because of the fact that the sprocket chain 22 passes over the sprocket wheel of one roller and under the sprocket wheel of the other of each pair whose faces are in contact, said rollers are driven concurrently in opposite directions to carry between them the stalks of flax. The importance of driving the rollers through the medium of the sprocket chain will further be appreciated when it is understood that in order to effect a proper adjustment of the pairs of rollers whose faces are contiguous, a lateral movement of the boxes in which the shafts of said rollers are journaled is necessary through an operation of the adjusting screws 13 and 14. This movement of said boxes in order to adjust said rollers, causes, necessarily, a variation in distance between the sprocket wheels of each operative pair of rollers. Because of the employment of the driving sprocket chain, this adjustment may be effected without in any way interfering with the driving of the rollers.

Because of the fact that the rollers are yieldingly or flexibly mounted on their shafts through the medium of the springs 17, a lateral adjustment of the boxes in which the shafts of the rollers are journaled, may be made to create any desired pressure between the contiguous faces of the rollers, operating in pairs, so as to afford the necessary grip upon the stalks between the faces of said rollers. It will further be apparent that because of the yielding or flexible mounting of the rollers on their shafts, a lateral movement of the rollers independently of the movement of the shaft is provided for, whereby said rollers may adjust themselves to any variation in the size of the stalks of flax, or in the quantity of flax which may from time to time pass between them, insuring a perfect operation of the rollers upon the stalks of flax to pull them from the ground under all conditions.

The guards 19 consist of upper arms which are secured at 36 to the opposite sides of the head portion of the brackets 5 and converge to a point 37, and of lower arms secured to the sides of the base portion of said brackets and converging to the point 37. The projecting points of the guards divide the stalks of flax, and the sides of said guards direct the divided stalks into the openings between the parallel brackets 5 in position for entrance between the pairs of rollers, as the machine moves forward.

For the purpose of gathering the stalks which enter between the guards, and passing them forcibly between the pairs of rollers, gatherers are mounted upon the upper ends of the roller shafts, each of which comprises a hub portion 38 which receives said shaft and from which extend the radial arms 39 which turn with said shaft and with the roller. The gatherers are so positioned with respect to the pairs of rollers which operate upon the stalks of flax to pull the same, as to cross a portion of the space between said rollers from opposite sides and forcibly engage and direct the stalks of flax therebetween. The gatherers are protected by a vertical housing 40 which is mounted upon the head of each of the brackets 5 and which is provided with openings 41 in the sides thereof through which the arms of the gatherers extend. As the shafts of the rollers revolve, the arms of the gatherers pass through said openings into engagement with the stalks of flax and withdraw into the housing through said openings after carrying the stalks of flax between the rollers. This arrangement prevents the stalks of flax becoming entangled with the arms of the gatherers and wrapped around the upper end of the roller shafts. For the purpose of withdrawing the arms of the gatherers more directly from the flax after said arms have operated thereon to carry the stalks between the rollers and prevent the possibility of dragging the stalks through the openings in the housings through which the arms pass, said arms may be pivotally mounted, as shown in Fig. 11, and actuated at a predetermined point to swing upon said pivots so as to shorten the sweep of said arms and cause them to withdraw more directly into the housing. This construction involves a rotary plate 42 which is fixed to and rotates with the shaft 8 and upon which are pivoted at 43 the gathering arms 39. Fixed to the head 11 of the bracket 5 is a cam 44 which may be maintained fixedly in place by a dowel pin 45 which enters said head. The pivoted ends of the arms 39 are provided with a lateral projection 45$^a$ having a concaved face 46 which rides upon the high point of the cam 44 and holds the arm extended and rigidly in operative position when engaging the stalks of flax to carry them between the rollers. After each arm in succession has acted upon the flax, the projection 45$^a$ thereon rides off of the high point of the cam, allowing the arm to swing upon its pivot and withdraw more directly into the housing, the position of said arms at which time is shown in Fig. 11, by the arms 39 which are engaging with their projections 45$^a$ the low side of the cam. As each arm in turn again encounters the high point of the cam, they are swung outwardly into operative position, as will be well understood.

In Fig. 7 is shown a transverse section of one of the rollers wherein is employed supporting or suspending springs of a different type from the springs illustrated in the other views of the drawing. The springs shown in Fig. 7 are flat U-shaped springs 47, the outer ends of which are bolted to the inner wall of the roller 4 and the inner ends of which are bolted, as shown at 48, to the shaft 8. Springs of the form shown in Fig. 7 for connecting the roller to the shaft suspend the roller flexibly or yieldingly upon the shaft in the same manner as do the springs 17. The last mentioned springs however are preferred because of their greater flexibility.

Extending horizontally along the front of the machine and passing through the base portions of the brackets 5 is the guard rod 49 which receives at its ends the nuts 50. This rod supports and strengthens the brackets at the base thereof and serves as a guard to protect the rollers and the driving mechanism thereof from injury by any object projecting from the ground which might otherwise damage said operative parts. Said rod also serves to clean the dirt from the roots of the flax stalks as they are drawn over it by the operation of the rollers in pulling the flax and discharging the stalks from between them onto the platform of the machine.

Having thus fully set forth our invention, what we claim as new and desire to secure by Letters Patent, is:—

1. In a flax harvesting machine, the combination with the frame thereof, of a series of rotatable rollers coöperating in pairs, the rollers of each pair being flexibly mounted upon their driving shafts to permit a transverse movement of the rollers with respect to the shafts during the rotation thereof.

2. In a flax harvesting machine, the combination with the frame, of a series of rotatable rollers supported on the frame coöperating in pairs, said rollers being flexibly mounted to have a transverse movement with respect to their axis of rotation.

3. In a flax harvesting machine, the combination with a supporting frame, of a plurality of rotatable shafts mounted in said frame, pulling rollers upon said shafts coöperating in pairs, each of said rollers being so connected with its supporting shaft as to have a transverse movement with respect thereto during the rotation thereof.

4. In a flax pulling machine, the combination with a suitable frame, of a plurality of rotatable shafts journaled in said frame in parallel relation, means for adjusting laterally the ends of said shafts, pulling rollers upon said shafts coöperating in pairs, each of said rollers being flexibly mounted on its driving shaft to have a transverse movement thereon independently of the movement of the shafts.

5. In a flax harvester, the combination with a suitable frame, of a plurality of forwardly and upwardly inclined shafts journaled in the frame in parallel relation, a plurality of pulling rollers mounted on said shafts and coöperating in pairs, a rotary gatherer upon the upper end of each shaft projecting in advance of the rollers, said gatherers coöperating in pairs to carry the stalks of flax between the pulling rollers of each pair, a sprocket wheel upon the lower end of each of said shafts, a sprocket chain passing over said sprocket wheels in a manner to impart the desired rotation to the roller shafts, and means for driving said sprocket chain.

6. In a flax harvesting machine, a frame, a plurality of rotatable shafts mounted on said frame, pulling rollers on said shafts coöperating in pairs, each of said rollers being so connected with its shaft as to have a transverse movement with relation thereto, a sprocket wheel on the lower end of each of said shafts, a sprocket chain passing over said sprocket wheels in a manner to impart the desired rotation to the rollers of each pair, and means for driving said chain.

7. In a flax harvesting machine, the combination with a suitable frame, of a plurality of forwardly and upwardly inclined shafts mounted in said frame, a plurality of pulling rollers upon said shafts coöperating in pairs, said rollers being flexibly mounted upon their shafts to have a transverse movement with respect to their normal axes of rotation, rotary gatherers upon the forwardly projecting upper ends of the roller shafts each having an axis of rotation fixed with respect to the axis of its shaft, said gatherers coöperating in pairs to carry the stalks of flax between the flexibly mounted rollers, and means for imparting to the rollers of each pair a rotary movement in opposite directions.

8. In a flax harvesting machine, the combination with a suitable frame, of a plurality of shafts journaled in said frame, a plurality of rollers loosely embracing said shafts, and springs in each of said rollers extending between the shaft and the wall of the roller and connecting the rollers to the shaft.

9. In a flax harvesting machine, the combination with a suitable frame, of a plurality of shafts journaled in the frame, rollers upon said shafts arranged to coöperate in pairs, a plurality of springs in each of said rollers, said springs crossing the roller diametrically and engaging the shaft to flexibly suspend the roller thereon.

10. In a flax harvesting machine, the combination with a suitable frame, of a plurality of shafts mounted in the frame, a movable box at the opposite end of each shaft, rollers mounted upon the shafts and coöperating in pairs, means for adjusting the boxes of the pairs of rollers to move the shafts of said rollers transversely, and springs within the rollers connecting them to their respective shafts.

11. In a flax harvesting machine, the combination with a suitable frame, of a plurality of forwardly and upwardly inclined shafts journaled in the frame coöperating in pairs, pulling rollers flexibly mounted upon said shafts to have a movement transversely of the normal axes thereof, said rollers coöperating in pairs, means for driving the roller shafts to cause the rollers of each pair to revolve in opposite directions, a rotary gatherer projecting in advance of each pair of rollers and disposed above the upwardly and forwardly inclined ends thereof, said gatherer being actuated to carry the stalks of flax between the rollers as they revolve.

12. In a flax harvesting machine, a frame, a plurality of rotatable shafts mounted on said frame, means for adjusting laterally the ends of said shafts, pulling rollers on said shafts coöperating in pairs, each of said rollers being so connected with its shaft as to have a transverse movement with relation thereto, a sprocket wheel on the lower end of each of said shafts, a sprocket chain passing over said sprocket wheels in a manner to impart the desired rotation to the rollers of each pair, and means for driving said chain.

13. In a flax harvesting machine, a frame, a plurality of rotatable shafts mounted on said frame, pulling rollers on said shafts coöperating in pairs, each of said rollers being so connected with its shaft as to have a transverse movement thereon, a rotary gatherer projecting in advance of each pair of rollers and disposed above the upper ends thereof, said gatherer being actuated to carry the stalks of flax between the rollers as they revolve, a sprocket wheel on the lower end of each of the roller shafts, a sprocket chain passing over said sprocket wheels in a manner to impart the desired rotation to the rollers of each pair, and means for driving said chain.

14. In a flax harvesting machine, a supporting frame, a plurality of rotatable shafts mounted in the frame, pulling rollers upon said shafts coöperating in pairs, one roller of each pair being movably connected with its supporting shaft to have a transverse movement with respect thereto during the rotation thereof, a rotary gatherer projecting in advance of each pair of rollers and actuated to carry the stalks of flax between the rollers of each pair as they revolve, and means for driving said rollers and said gatherers.

15. In a machine for the purpose set forth, the combination with a suitable frame, of a plurality of brackets mounted in said frame in parallelism and spaced from one another, the bases of said brackets projecting forwardly and upwardly, rollers journaled in said brackets, said rollers coöperating in pairs to pull the stalks of flax, and a guard rod passing through and connecting the projecting bases of said brackets, said rod crossing the spaces between the brackets below and in advance of the lower ends of said rollers.

16. In a flax harvesting machine, the combination with a supporting frame, of a plurality of rotatable shafts mounted in the frame, pulling rollers upon said shafts coöperating in pairs, one roller of each pair being movably connected with its supporting shaft to have a transverse movement with respect thereto during. the rotation thereof.

17. In a flax harvesting machine, a frame, a plurality of rotatable shafts mounted on the frame, pulling rollers on said shafts coöperating in pairs, one roller of each pair being movably connected with its shaft to have a transverse movement with respect thereto, a rotary gatherer projecting in advance of each pair of rollers and disposed above the upper ends thereof, said gatherer being actuated to carry the stalks of flax between the rollers as they revolve, a sprocket wheel on the lower end of each of the roller shafts, a sprocket chain passing over said sprocket wheels in a manner to impart the desired rotation to the rollers of each pair, and means for driving said chain.

18. A flax harvesting machine comprising, a frame, a series of rotatable pulling rollers supported on the frame coöperating in pairs, one roller of each pair being movably mounted on its supporting parts to have a transverse movement with respect to its normal axis of rotation.

19. A flax harvester comprising a suitable frame, a plurality of forwardly and upwardly inclined shafts journaled in the frame in parallel relation, a plurality of relatively long pulling rollers mounted on said shafts in operative relation and coöperating in pairs to pull the stalks of flax by direct engagement of the rotating peripheries of the rollers therewith throughout the entire length of said rollers, a rotary gatherer on the upper end of each roller shaft projecting in advance of said rollers, said gatherers coöperating in pairs to carry the stalks of flax between the pulling rollers of each pair, and means for rotating the roller shafts to impart to the rollers and gatherers the desired rotation.

20. A flax harvesting machine comprising a suitable frame, a plurality of rotatable pulling rollers flexibly mounted to have a movement transversely of their normal axis of rotation, said rollers coöperating in pairs, means for driving the rollers to cause the rollers of each pair to revolve in opposite directions, a rotary gatherer projecting in advance of each pair of rollers, said gatherers being actuated to carry the stalks of flax between the rollers as they revolve.

21. A flax harvesting machine comprising a frame, a series of rotatable pulling rollers supported on the frame coöperating in pairs, one roller of each pair being movably mounted on its supporting parts to have a transverse movement with respect to its normal axis of rotation, a rotary gatherer for each pair of rollers, and means for rotating said rollers and said gatherers.

In testimony whereof, we sign this specification in the presence of two witnesses.

JULIUS H. PHILIPP.
CHARLES F. GARAGHTY.

Witnesses:
E. S. WHEELER,
I. G. HOWLETT.